United States Patent Office 2,864,739
Patented Dec. 16, 1958

2,864,739
PESTICIDAL COMPOSITIONS COMPRISING SULFURIZED MERCAPTALS

Carleton B. Scott, Pomona, and Irving D. Webb, Yorba Linda, Calif., assignors, by mesne assignments, to Collier Carbon and Chemical Corporation, a corporation of California No Drawing. Application May 13, 1957
Serial No. 658,532

14 Claims. (Cl. 167—22)

This invention relates to compositions of matter useful for the control of pest organisms, and in particular concerns fungicidal and nematocidal compositions comprising certain sulfurized dimethyl mercaptals as the essential active ingredient.

As is well known, the dimethyl mercaptals are formed by reaction between methyl mercaptan and an aldehyde in accordance with the equation:

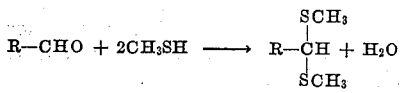

wherein R represents a monovalent organic radical which is free from substituent groups reactive with mercaptans. The reaction takes place readily at moderately elevated temperatures in the presence of an acidic catalyst such as hydrogen chloride or zinc chloride, and a wide variety of dimethyl mercaptals are known and have been prepared in such manner. The nomenclature of such mercaptals is derived from aldehydes from which they are formed. Thus, the mercaptal obtained from methyl mercaptan and acetaldehyde is termed "dimethyl acetaldehyde mercaptal," and that obtained from methyl mercaptan and salicylaldehyde is known as "dimethyl salicylaldehyde mercaptal."

The present invention is based on our discovery that while the dimethyl mercaptals themselves have little fungicidal activity, the reaction products of such mercaptals with elemental sulfur are highly toxic to a variety of fungi and nematodes, and may hence be advantageously employed as the active ingredient in fungicidal and nematocidal compositions of more or less conventional formulation. As is hereinafter more fully pointed out, the sulfurization reaction can be controlled so as to produce sulfurized mercaptal products containing from one to an average of about ten atoms of sulfur per molecule of the mercaptal. Any of such sulfurized products can be employed in the formulation of fungicidal and nematocidal compositions in accordance with the invention.

The mercaptals which are reacted with sulfur to form the various members of present class of toxicants are dimethyl mercaptals of the formula:

wherein R represents either an alkyl radical containing from 1 to about 22 carbon atoms or an aryl radical. Illustrative examples of the dimethyl alkyl mercaptals include the compounds of the above formula wherein R represents methyl, ethyl, n-propyl, isopropyl, tert.-butyl, n-hexyl, tert.-octyl, amyl, lauryl, cetyl, octadecyl, eicosyl, etc. Examples of the aryl compounds include the compounds of the above formula wherein R represents phenyl, naphthyl, xylyl, cresyl, cumyl, alpha-chloronaphthyl, p-bromphenyl, m-hydroxyphenyl, p-ethylphenyl, tert.-octylphenyl, 3,5-di-isopropylphenyl, p-cyclohexylphenyl, alpha-methylnaphthyl, etc. Mixtures of such mercaptals, obtained by reacting methyl mercaptan with mixed aldehydes (for example, those obtained by the Oxo reaction) may also be employed.

The sulfurization reaction takes place readily upon heating a mixture of the two reactants at moderately elevated temperatures under atmospheric or elevated pressures. Preferably, the reaction is carried out in a closed vessel under autogenic pressure. The reaction temperature should be sufficiently elevated to effect chemical reaction between the two reactants rather than mere solutions of one in the other. If a mixture of elemental sulfur and one or a mixture of dimethyl mercaptals is gradually heated it will be observed that at a relatively low temperature, e. g., 70° C., the sulfur dissolves and the mixture becomes a single liquid phase. If the heating is stopped at this point and the mixture is allowed to cool to about 20° C., free sulfur crystallizes out of solution, thus indicating that mere physical solution rather than chemical reaction has occurred. On the other hand, if the heating is continued and the temperature is increased to, say, 150° C. and is allowed to remain there for a suitable length of time, substantially no free sulfur crystallizes upon subsequent cooling, thereby indicating that true chemical reaction has taken place between the two reactants. The temperature at which such reaction occurs depends to some extent upon the identity of the mercaptal reactant, but is usually at least about 100° C. In practice it is preferred to operate at temperatures between about 125° C. and about 250° C. The time required for completion of the reaction depends upon the reaction temperature and the proportions in which the two reactants are employed, but is usually between about 0.5 and about 12 hours, with the longer periods within the range being employed when the reaction temperature is relatively low and/or the proportion of sulfur to mercaptal is relatively high. As a general rule, heating the two reactants at a temperature between about 125° C. and about 200° C. for a period of time between about 1 and about 6 hours will lead to optimum results. If desired, the reaction may be promoted by carrying it out in the presence of a small amount of a metal salt Lewis acid, e. g. zinc chloride.

As stated, from one to an average of about ten atoms of sulfur can be introduced into the mercaptal molecule. Accordingly, in preparing the present toxic agents as described above, from one to about ten atomic weights of sulfur may be provided per molecular weight of the mercaptal. If desired, an excess of sulfur may be provided and the unreacted excess separated from the sulfurized product upon completion of the reaction. The physical and biological properties of the sulfurized products vary somewhat with the amount of sulfur contained therein, and insofar as pesticidal activity and ease of formulation into simple pesticidal compositions are concerned it is preferred to employ the products containing an average of from about two to about six atoms of sulfur per molecule of the mercaptal.

Procedurewise, the reaction is carried out simply by charging the desired amounts of the two reactants into a suitable reaction vessel and heating the mixture under the conditions previously described. If desired, the reaction may be carried out in the presence of an inert liquid reaction medium, e. g., benzene, toluene, carbon tetrachloride, etc., which is subsequently either removed from the finished product by distillation or is allowed to remain therewith to serve as a dispersing aid in formulating pesticidal compositions. Ordinarily, however, it is preferred to dispense with reaction media and to effect the reacton by heating a simple mixture of the reactants. Upon completion of the reaction the product can be used directly and without further purification in formulating the present pesticidal compositions. If desired, however, the product may be gas-stripped to remove volatile by-products and/or fractionally distilled into fractions containing varying amounts of combined sulfur.

To summarize the foregoing, the toxicants employed in practicing the invention are sulfurized mercaptals obtained by reacting elemental sulfur with one or a mixture of dimethyl mercaptals of the present class at a reaction temperature between about 100° C. and about 250° C. for a period of time between about 0.5 and about 12 hours, at least one atomic weight of sulfur being employed per molecular weight of said mercaptal and said conditions of time and temperature being sufficient to effect the formation of a sulfurized mercaptal product containing from one to an average of about ten atoms of sulfur per molecule of said mercaptal.

The following examples will illustrate the preparation of the members of the present class of pesticidal agents, but are not to be construed as limiting the invention. All proportions are stated in parts by weight:

Example I

A mixture of 45 parts (0.3 molecular weight) of dimethyl butyraldehyde mercaptal and 19 parts (0.6 atomic weight) of sulfur was charged to a rocking autoclave and heated at about 150° C. for 5 hours under autogenic pressure. The product was removed from the autoclave and cooled to about 20° C.; no free sulfur was thereby precipitated. Analysis of the product, which took the form of a viscous brown liquid, indicated it to be dimethyl butyraldehyde mercaptal disulfide corresponding to the formula $C_3H_7CH(SCH_3)_2 \cdot S_2$.

Example II

A mixture of 50.6 parts (0.2 molecular weight) of dimethyl 2,4-dichlorobenzaldehyde mercaptal and 12.8 parts (0.4 atomic weight) of sulfur was heated at 150° C. for 5 hours in a rocking autoclave under autogenic pressure. The product so obtained was a waxy semi-solid which was completely soluble in benzene and from which no sulfur separated upon cooling to about 20° C. After purification by stripping with nitrogen under 1 mm. pressure, its analysis corresponded to that of dimethyl 2,4-dichlorobenzaldehyde mercaptal disulfide.

The fungicidal and nematocidal compositions provided by the invention essentially comprise one or a mixture of the aforesaid sulfurized dimethyl mercaptals and an inert pesticidal carrier material which may be either liquid or solid or a combination of both. When the composition is to take the form of a liquid spray or dip, the inert carrier material is usually water and the active ingredient is maintained dispersed or suspended therein with the aid of an organic dispersing agent. Alternatively, the sulfurized mercaptal may be mixed with an inert solid carrier material such as talc, diatomaceous earth, aluminum silicate, etc. to form dry compositions which can be employed as such in the form of dusts or which can be dispersed in an aqueous or oleaginous medium to form a liquid spray. In general, any of the conventional formulation and application techniques may be followed in employing the present sulfurized mercaptals for pesticidal uses, and any of the wetting agents, spreaders, sticking agents, diluents, carrier materials, etc. which are conventionally employed in formulating pest control compositions may be employed in combination with the present active ingredients.

The sulfurized mercaptal toxicants of the present class are effective in relatively small quantities, and in the interests of economy they are usually applied in concentrations of the order of 50–4000 parts per million. Liquid concentrate compositions usually contain between about 1 and about 15 percent by weight of the active ingredient and sufficient of an emulsifying or dispersing agent to maintain the active ingredient uniformly dispersed in the liquid suspending medium. Solid concentrate compositions usually contain between about 5 and about 50 percent by weight of the active ingredient and, optionally, small amounts of dispersing agents, spreading agents, and other conventional adjuvants.

The following examples will illustrate the formulation of a number of pesticidal compositions within the scope of the invention, but are not to be construed as limiting the same.

Example III

| | Lbs. |
|---|---|
| Dimethyl salicylaldehyde mercaptal trisulfide | 2.0 |
| Attapulgus clay | 2.5 |
| Aluminum silicate | 40.0 |
| Powdered blood albumen | 0.2 |

The ingredients are thoroughly admixed in a ball mill to obtain a fungicidal dusting composition suitable for direct application to plants.

Example IV

| | Lbs. |
|---|---|
| Dimethyl cetylaldehyde mercaptal hexasulfide | 2.5 |
| Water | 50.0 |
| Powdered blood albumen | 0.25 |

The sulfurized mercaptal and blood albumen are added to the water, and the mixture is passed through a colloid mill or high speed blender to obtain a concentrate composition which can be diluted 1000:1 with water to form a spray for application either to plants or to fungus- or nematode-infested soil.

Example V

| | Lbs. |
|---|---|
| Dimethyl p-brombenzaldehyde mercaptal monosulfide | 0.5 |
| Benzene | 5.0 |
| Non-phytotoxic spray oil | 4000.0 |

This composition is useful as a tree spray.

Example VI

| | Lbs. |
|---|---|
| Dimethyl naphthaldehyde mercaptal tetrasulfide | 10.0 |
| Kerosene extract oil | 150.0 |

This composition may be employed for treating lumber.

Example VII

| | Lbs. |
|---|---|
| Dimethyl nonylaldehyde mercaptal disulfide | 2.5 |
| Water | 50.0 |
| Commercial sticking agent | 0.5 |
| Commercial spreading agent | 0.5 |

The ingredients are admixed in a colloid mill, and are thereafter diluted with 250 gallons of water to obtain a spray composition containing about 250 parts per million of the active ingredient.

Example VIII

| | Lbs. |
|---|---|
| Dimethyl acetaldehyde mercaptal trisulfide | 0.5 |
| Benzene | 0.1 |
| Non-ionic dispersing agent | 0.2 |
| Water | 500.0 |

The active ingredient is dissolved in the benzene, and the dispersing agent is admixed with the water. The two solutions are then combined and passed through a homogenizer to obtain a spray composition.

Example IX

| | Lbs. |
|---|---|
| Dimethyl 3,5 - dimethylbenzaldehyde mercaptal monosulfide | 2.0 |
| Walnut shell flour | 40.0 |
| Petroleum sulfonates | 0.3 |

The ingredients are admixed in a ball mill to obtain a dry concentrate composition which can subsequently be dispersed in water to form a spray.

Example X

| | Parts by Wt. |
|---|---|
| Active ingredient | 10.0 |
| Attapulgus clay | 30.0 |
| "Neoterge" wetting agent | 0.12 |
| "Dupanol ME" wetting agent | 0.05 |
| Lignin sulfate suspending agent | 0.12 |

The ingredients are thoroughly admixed by grinding together in a mortar to form a wettable powder which is employed in demonstrating the pesticidal activity of the present class of sulfurized mercaptals. In carrying out in vitro tests on fungi, a 10-gram sample of the composition is added to enough distilled water to make 100 grams, and the mixture is homogenized for three minutes in a high-speed blender. With the blender still operating, 3 grams of the liquid are removed therefrom and are stirred into 750 grams of liquid potato dextrose agar at 45° C. and the agar is transferred to a Petri dish. The agar so prepared contains 100 p. p. m. of the active ingredient. The agar is then allowed to cool and solidify, and a ¼" disc of the test fungus is placed on the surface of the agar. The inoculated agar is incubated for two days, after which the extent of the fungus growth is measured and the extent of inhibition of fungus growth is calculated as follows:

$$\text{Percent inhibition} = \frac{\text{growth on test sample}}{\text{growth on blank}} \times 100$$

The following tabulation presents inhibition values obtained by subjecting several of the present sulfurized mercaptals, together with the corresponding unsulfurized mercaptals, to the foregoing test procedure employing a variety of test organisms.

| Active Ingredient | Percent Inhibition ||||||
|---|---|---|---|---|---|---|
| | R. solani | F. roseum | P. ultimum | S. sclerotiorum | B. cineria | A. solani |
| Dimethyl n-butyraldehyde mercaptal | 21.0 | 10.5 | 16.2 | 33.3 | 30.0 | 0.0 |
| Dimethyl n-butyraldehyde mercaptal disulfide | 88.7 | 68.4 | 100 | 100 | 75.4 | 88.5 |
| Dimethyl 2,4-dichlorobenzaldehyde mercaptal | 73.6 | 35.7 | 49.5 | 55 | 37.8 | |
| Dimethyl 2,4-dichlorobenzaldehyde mercaptal disulfide | 98.6 | 84.2 | 100 | 100 | 100 | 100 |
| Dimethyl 2-ethylhexaldehyde mercaptal | 48.5 | 32.7 | 19.4 | 27.5 | 32.5 | 10 |
| Dimethyl 2-ethylhexaldehyde mercaptal disulfide | 67.6 | | 100 | 100 | | |

In tests carried out in the greenhouse with living plants, the aforementioned wettable powder test composition is suspended in water to form a liquid composition containing 200 p. p. m. of the active ingredient. Samples of soil which is infested with the test organism are then treated with the liquid composition, and seeds of the test plant are sowed in the soil. The planted samples are maintained under greenhouse conditions for a period of time which depends upon the particular test plant employed, after which they are examined and compared with blank specimens which have been grown in untreated soil. Through such test procedure it was found that dimethyl n-butyraldehyde mercaptal disulfide provided 100% control of *Rhizoctonia solani* on cotton plants, and dimethyl benzaldehyde mercaptal disulfide provided 80% control of *Pythium ultimum* on pea plants, 90–95% control of Septoria blight on tomato plants, and 75–80% control of *Alternaria solani* on tomato plants. In nematocide tests, employing the active ingredient in a concentration of 200 p. p. m., dimethyl benzaldehyde mercaptal disulfide provided 90–95% control when applied as a drench to plants growing in infested soil. In bactericide tests, dimethyl 2,4-dichlorobenzaldehyde mercaptal disulfide at a concentration of 100 p. p. m. provided 100% control of *Erwinis carotovora, Pseudomonas syringae, Agrobacterium tumefaciens,* and *Xanthamonas juglandis.*

Other modes of applying the principle of our invention may be employed instead of those explained, change being made as regards the methods or materials employed, provided the products or steps stated by any of the following claims, or the equivalent of such stated products or steps, be obtained or employed.

We, therefore, particularly point out and distinctly claim as our invention:

1. A fungicidal and nematocidal composition comprising an inert pesticidal carrier material and, as the essential active ingredient, a sulfurized mercaptal obtained by heating a dimethyl mercaptal of the formula:

wherein R represents a monovalent substituent selected from the class consisting of aryl radicals and alkyl radicals containing from 1 to about 22 carbon atoms, with elemental sulfur at a temperature between about 100° C. and about 250° C. for a period of time between about 0.5 and about 12 hours, at least one atomic weight of sulfur being employed per molecular weight of said dimethyl mercaptal and said conditions of time and temperature being sufficient to effect the formation of a sulfurized mercaptal product containing from 1 to an average of 10 atoms of sulfur per molecule of said dimethyl mercaptal.

2. A composition as defined by claim 1 wherein the said carrier material comprises a particulate inorganic solid.

3. A composition as defined by claim 1 wherein the said carrier material comprises water and sufficient of a dispersing agent to maintain said active ingredient uniformly dispersed in said water.

4. A composition as defined by claim 1 wherein said sulfurized mercaptal contains an average of from about 2 to about 6 atoms of sulfur per molecule of said dimethyl mercaptal.

5. A composition as defined by claim 1 wherein said dimethyl mercaptal is dimethyl n-butyraldehyde mercaptal.

6. A composition as defined by claim 1 wherein said dimethyl mercaptal is dimethyl benzaldehyde mercaptal.

7. A composition as defined by claim 1 wherein said dimethyl mercaptal is dimethyl 2,4-dichlorobenzaldehyde mercaptal.

8. A fungicidal and nematocidal composition comprising an inert pesticidal carrier material and, as the essential active ingredient, a sulfurized mercaptal obtained by heating a dimethyl mercaptal of the formula:

wherein R represents a monovalent substituent selected from the class consisting of aryl radicals and alkyl radicals containing from 1 to about 22 carbon atoms, with elemental sulfur at a temperature between about 125° C. and about 200° C. for a period of time between about 1 and about 6 hours under autogenic pressure and thereafter separating from the product so obtained any unreacted sulfur, at least 2 atomic weights of sulfur being employed per molecular weight of said dimethyl mercaptal and said conditions of time and temperature being sufficient to effect the formation of a sulfurized mercaptal product containing an average of from about 2 to about 6 atoms of sulfur per molecule of said dimethyl mercaptal.

9. A composition as defined by claim 8 wherein the said carrier material is a particulate inorganic solid.

10. A composition as defined by claim 8 wherein the carrier material comprises water and sufficient of a dispersing agent to maintain said active ingredient uniformly dispersed in said water.

11. A composition of matter adapted to being diluted with water to form a fungicide, said composition comprising water, between about 1 and about 15 percent by weight of a sulfurized mercaptal obtained as defined in claim 8, and sufficient of a dispersing agent to maintain said sulfurized mercaptal uniformly dispersed in said water.

12. A composition of matter adapted to being dispersed in water to form a fungicide, said composition comprising an inert particulate inorganic pesticidal carrier material, between about 5 and about 50 percent by weight of a sulfurized mercaptal obtained as defined in claim 8, and sufficient of a dispersing agent to maintain said carrier material and said sulfurized mercaptal uniformly dispersed in said water.

13. The method of controlling the growth of fungi and nematodes which comprises applying thereto a toxic amount of a composition as defined by claim 1.

14. The method of controlling the growth of fungi and nematodes which comprises applying thereto a toxic amount of a composition as defined by claim 8.

No references cited.